Figure 1:
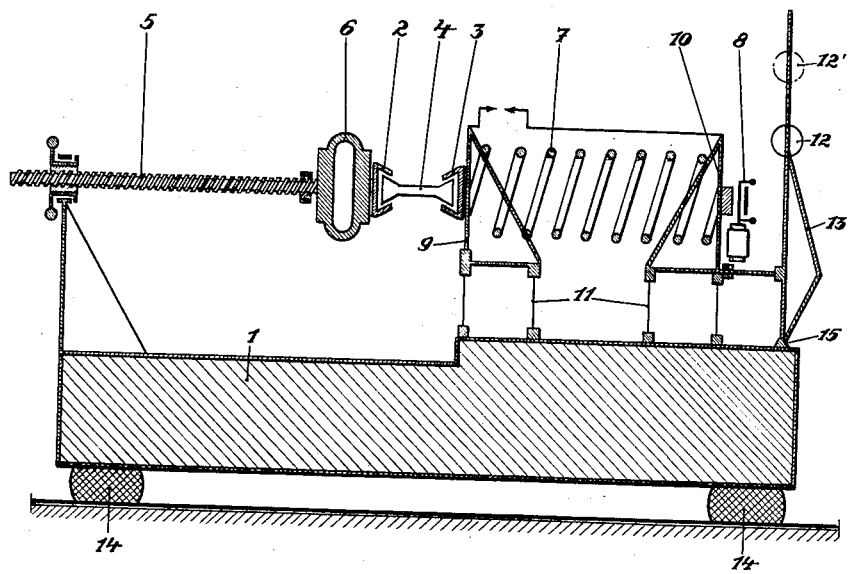

Jan. 22, 1957  K. FEDERN  2,778,222
DYNAMIC MATERIAL TESTING MACHINE
Filed May 19, 1954

United States Patent Office 2,778,222
Patented Jan. 22, 1957

2,778,222
DYNAMIC MATERIAL TESTING MACHINE

Klaus Federn, Darmstadt, Germany, assignor to Carl Schenck Maschinenfabrik G. m. b. H., Darmstadt, Germany, a corporation of Germany Application May 19, 1954, Serial No. 430,931

Claims priority, application Germany June 26, 1953

2 Claims. (Cl. 73—92)

This invention relates to material testing machines and is directed particularly to dynamic testing machines of the type inducing oscillatory loads in specimens for determining fatigue strength. Such testing machines are sometimes called pulsers.

Dynamic fatigue testing machines for inducing large oscillatory forces, operate preferably in resonance. In ordinary machines where the elasticity of the specimen itself largely determines the resonance frequency, this frequency increases with an increasing rigidity of the specimen. For that reason, testing frequencies of 12,000 to 15,000 cycles per minute may occur. However, since fatigue strength increases at high testing frequencies, particularly in light metals having elastic after-effects, such high frequencies cannot yield a reliable value indicative of the properties of the specimen material.

Although the testing frequency can be successfully reduced to about 2,500 cycles per minute if an auxiliary elastic member, for instance a helical or leaf spring, that essentially determines the resonance frequency, is connected in series with the specimen, this frequency is still too high for testing materials of rubber, for example. In testing such resilient materials a low frequency of from 300 to 500 cycles per minute is often desired. At the other extreme, for comparative tests with small specimens of steel, a frequency of about 6,000 cycles per minute is required.

If one attempted to seek a solution of the problem by changing the auxiliary spring so as to adapt the resonance and testing frequency to the requirement of the particular specimen being tested, a large number of expensive auxiliary springs would be necessary. It is simpler to vary the oscillating mass. However, the range of variation required in practice is wide, as pointed out above, so that for operating with large testing forces, correspondingly large auxiliary masses would have to be added and then again removed. For the testing of rigid specimens at pressures of ±3 tons at 3,000 load changes per minute, it would be necessary to attach as much as 1,000 kg. additional mass to the machine. On the other hand, if a specimen being tested had an elasticity forty times greater and the testing frequency was only one half as large, an auxiliary mass of only 100 kg. would be sufficient.

It is the principal object of the invention to obviate such difficulties in the application and variation of auxiliary masses in dynamic testing machines. To this end and in accordance with a feature of my invention, the auxiliary mass or masses are connected with the exciting end of the testing machine through the longer arm of a step-up transmitting lever. With a step-up lever transmission ratio of 1:3, the testing of rigid specimens in the above-mentioned example would require an auxiliary mass of at most 100 kg. and this auxiliary mass would be reduced down to 10 kg. for the testing of softer specimens. To add and remove 90 kg. in cases where such an addition is needed, is a simple requirement and can be carried out with simple structural means without difficulties.

Other objects and advantages of the invention will appear from the more detailed description set forth below, it being understood that this description is given by way of illustration and explanation only and that various changes may be made by those skilled in the art without departing from the scope and spirit of the appended claims.

In the drawing, wherein like reference numerals denote corresponding parts in the two views.

Figure 2:
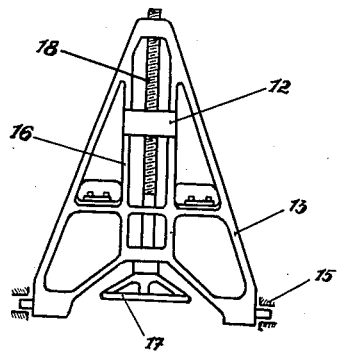

Fig. 1 is a schematic side-elevational view of a dynamic, pulser-type testing machine according to the invention, and Fig. 2 is an end elevational view exemplifying the mechanical structure of the auxiliary mass coupling portion of the machine.

The machine comprises a heavy bed structure 1 mounted on elastic feet 14 and equipped with two clamping heads 2 and 3 for gripping the specimen 4. A force-measuring device (tensiometer) 6 is firmly connected with the clamping head 2 and is adjustable by means of a screw spindle 5. Connected with the clamping head 3 is a helical spring 7 for transmitting the oscillatory loads to the specimen. The pulsating loads are excited by means of a motor driven unbalance wheel 8 acting upon the other end of spring 7. The excitation spring 7 is clamped between two shields 9 and 10 each of which is flexibly carried on a plurality of elastic links 11.

An auxiliary mass 12 is coupled with the shield 10 by a transmission lever 13. The fulcrum point 15 of the lever structure is fixed relative to the bed structure 1. The transmission ratio can be adjusted as desired by displacing the mass 12 along the lever 13. To further extend the frequency range of operation a larger or smaller mass can readily be substituted for the mass 12.

Figure 2 illustrates by way of example how the auxiliary mass coupling portion at the right-hand end of the machine as illustrated schematically in Fig. 1 could be constructed. The transmission lever as shown in Fig. 2 is a rigid triangular casting provided with central, parallel, upwardly-extending guide tracks 16 within which the mass 12 is movable upwardly of the fulcrum point. Continuous adjustment of the weight can be made by turning the screw handle 17 having an upwardly-extending screw portion 18 threaded in a tapped central opening in the weight 12.

The invention is also applicable with testing machines that, instead of having the loading spring 7 or in addition thereto are equipped with a pre-tensioning spring for applying static pre-loading upon the specimen.

While there is disclosed in this specification only one embodiment of the invention, it is to be understood that this embodiment is shown for the purpose of illustration only and that the invention is not to be limited to the specific disclosure but may be modified and embodied in various other forms without departing from its spirit. In short, the invention contains all the modifications and embodiments coming within the scope of the following claims.

I claim:

1. An oscillatory fatigue testing machine, comprising a rigid base, two aligned holding means mounted on said base for accommodating a specimen between each other, one of said holding means being oscillatorily connected with said base for movement in the alignment direction, an abutment structure spaced from said one holding means in said direction and being oscillatorily mounted on said base for movement in said direction, a load transmitting spring disposed between said one holding means and said structure, a lever having a fulcrum at said base and being oscillatory in said direction, said lever having a point linked with said structure at a distance from said fulcrum, and a weight mounted on said lever and displaceable along said lever over a range of displacement spaced more than said distance from said fulcrum for varying the force-amplifying leverage of said weight relative to said structure, said weight and abutment forming an oscillator assembly together with said spring and the specimen, and oscillation generating means connected with said oscillator assembly for exciting it to resonant oscillations.

2. In a fatigue testing machine according to claim 1, said lever comprising a frame structure having two coaxial fulcrum pins axially spaced from each other in a plane perpendicular to said alignment direction and having a recess between said two pins, said frame structure forming a short lever arm between said fulcrum and said point and a long lever arm beyond said point, said frame structure having a guide track along said long arm, said weight being slidable on said guide track, a screw spindle revolvably mounted on said frame structure along said track and in threaded engagement with said weight, and a weight-control member mounted on said spindle and located in said recess so as to be close to the fulcrum axis of said lever.

References Cited in the file of this patent

UNITED STATES PATENTS 1,577,395    Welch _____ Mar. 16, 1926

FOREIGN PATENTS 828,769    Germany _____ Jan. 21, 1952
890,876    Germany _____ Sept. 24, 1953